United States Patent
Ortega Dona

(10) Patent No.: US 9,689,420 B2
(45) Date of Patent: Jun. 27, 2017

(54) METHOD FOR MANUFACTURING A NUT BY THE PROGRESSIVE PRESS FORGING OF A LAMINAR METAL SHEET AND RESULTING NUT

(71) Applicant: ILLINOIS TOOL WORKS INC., Glenview, IL (US)

(72) Inventor: Raul Ortega Dona, Barcelona (ES)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 14/769,874

(22) PCT Filed: Feb. 20, 2014

(86) PCT No.: PCT/US2014/017477
§ 371 (c)(1),
(2) Date: Aug. 24, 2015

(87) PCT Pub. No.: WO2014/133872
PCT Pub. Date: Sep. 4, 2014

(65) Prior Publication Data
US 2016/0010678 A1    Jan. 14, 2016

(30) Foreign Application Priority Data

Feb. 28, 2013 (ES) .................................. 201300213

(51) Int. Cl.
*F16B 37/00* (2006.01)
*B21K 1/64* (2006.01)
(Continued)

(52) U.S. Cl.
CPC ................ *F16B 37/00* (2013.01); *B21K 1/64* (2013.01); *F16B 37/02* (2013.01); *B21D 53/24* (2013.01)

(58) Field of Classification Search
CPC ........ F16B 23/00; F16B 33/002; F16B 37/00; F16B 37/02; B21D 53/24; B21K 1/64
(Continued)

(56) References Cited

U.S. PATENT DOCUMENTS

| 111,996 A | * | 2/1871 | Washbourne ........... F16B 37/00 |
| | | | 411/427 |
| D28,212 S | * | 1/1898 | Von Biedenfeld ............ 411/427 |

(Continued)

FOREIGN PATENT DOCUMENTS

| CN | 1046108 A | 10/1990 |
| CN | 1178145 A | 4/1998 |

(Continued)

OTHER PUBLICATIONS

ISR and WO for PCT/US2014/17477 mailed Jun. 27, 2014.

*Primary Examiner* — Roberta Delisle
(74) *Attorney, Agent, or Firm* — Hauptman Ham, LLP

(57) ABSTRACT

METHOD FOR MANUFACTURING A NUT BY THE PROGRESSIVE PRESS FORGING OF A LAMINAR METAL SHEET AND RESULTING NUT, in which said method comprises the steps of:
  producing a piece with a supporting washer, a dome and an emergent hexagonal part by press forging starting from a laminar metal sheet of material of suitable thickness, said piece being of uniform thickness; and
  creating a threaded internal cylinder by progressive press forging of the interior of said hexagonal emergent part, displacing material laterally from the central zones of said faces to the zones of the angles,
  heat treating the piece obtained, treatment intended to provide the piece with greater strength, especially a yield strength Rp 0.2% of approximately 1200 MPa and a tensile strength Rm of approximately 1400 MPa.

17 Claims, 2 Drawing Sheets

(51) Int. Cl.
*F16B 37/02* (2006.01)
*B21D 53/24* (2006.01)

(58) Field of Classification Search
USPC .......................................................... 411/427
See application file for complete search history.

(56) References Cited

U.S. PATENT DOCUMENTS

| | | | | |
|---|---|---|---|---|
| 1,062,015 | A * | 5/1913 | Lane | F16L 5/10 |
| | | | | 285/139.1 |
| 1,088,437 | A * | 2/1914 | Moore | B21K 1/64 |
| | | | | 411/427 |
| 2,106,984 | A * | 2/1938 | Maldon | F16B 39/36 |
| | | | | 411/436 |
| 2,451,512 | A * | 10/1948 | Rice | B21C 23/186 |
| | | | | 72/328 |
| 2,826,631 | A * | 3/1958 | Rohe | F16B 33/004 |
| | | | | 174/138 R |
| 3,216,302 | A * | 11/1965 | Kluth | F16B 23/003 |
| | | | | 411/427 |
| 4,269,248 | A * | 5/1981 | MacLean | F16B 39/282 |
| | | | | 411/186 |
| 4,281,699 | A * | 8/1981 | Grube | F16B 39/282 |
| | | | | 411/176 |
| 4,654,913 | A * | 4/1987 | Grube | B21D 53/24 |
| | | | | 470/18 |
| 5,564,873 | A * | 10/1996 | Ladouceur | B23P 19/062 |
| | | | | 411/179 |
| 6,139,237 | A * | 10/2000 | Nagayama | F16B 37/048 |
| | | | | 411/176 |
| 6,244,807 | B1 * | 6/2001 | Garcia | F16B 33/004 |
| | | | | 411/369 |
| 7,802,954 | B2 * | 9/2010 | Albach | F16B 23/0061 |
| | | | | 411/176 |
| 2008/0166200 | A1 * | 7/2008 | Hippensteele | F16B 31/02 |
| | | | | 411/14.5 |
| 2009/0016848 | A1 | 1/2009 | Flaig | |
| 2010/0047037 | A1 * | 2/2010 | Ishida | F16B 37/00 |
| | | | | 411/427 |
| 2011/0226096 | A1 * | 9/2011 | Berton | F16B 37/00 |
| | | | | 81/121.1 |

FOREIGN PATENT DOCUMENTS

| | | |
|---|---|---|
| CN | 101336348 A | 12/2008 |
| CN | 102000755 A | 4/2011 |
| CN | 102257282 A | 11/2011 |
| DE | 4105541 A1 | 7/1992 |
| EP | 2379896 A1 | 10/2011 |
| GB | 789395 A | 1/1958 |
| WO | 2010070598 A1 | 6/2010 |

* cited by examiner

METHOD FOR MANUFACTURING A NUT BY THE PROGRESSIVE PRESS FORGING OF A LAMINAR METAL SHEET AND RESULTING NUT

RELATED APPLICATIONS

The present application is a National Phase of International Application Number PCT/US2014/017477 filed Feb. 20, 2014 and claims priority to Spanish Application Number P201300213 filed Feb. 28, 2013.

SCOPE OF THE INVENTION

This invention relates to a nut and its method of manufacture, of the type used in the attachment of applied objects, which has a flange, a connecting dome and an emergent body with an internal thread and a hexagonal external surface for tightening by means of a tool, with the special feature that the material blank is uniform, of reduced thickness, at the same time improving the mechanical properties of the piece.

PRIOR ART

Nuts similar to those in the invention which incorporate a washer or supporting base from which emerges a part with a hexagonal exterior and a threaded internal cylinder are known; that is, nuts incorporating in a single piece an enlarged supporting surface or washer, a hexagonal external part for operation by means of a tool and the tube proper which, through its threaded interior, makes it possible to insert a thread securing the applied component. This is the case for example in European Patent EP2379896 or DE4105541.

U.S. Pat. No. 4,281,699 provides a similar nut in which the outer hexagonal part and the inner threaded part coincide in the same part of the piece. This type of construction makes it possible to reduce the overall height of the piece, but in exchange for it having appreciable weight. It is in fact necessary to provide material to form both the outer hexagon and the threaded interior, which is normally tapped in the already formed piece.

Nuts of this type may be manufactured through combining various parts which are joined together, or from a single material. In the latter case they are manufactured from wires or tubes of different thicknesses and of different nature; for example steel, stainless steel, hardened nickel, galvanized iron or other ferrous materials. They may be treated with carbon, boron, heat treatment, etc., to provide them with suitable hardness and strength.

In general the wire or tube is cold formed in a process similar to that used for the manufacture of screws and bolts, in order to form both their outer and inner shapes. The thickness of the starting tube or wire is selected as claimed in the size of the nut being manufactured. Losses of material occur in this process of cold forming and subsequent tapping, and in general it can be said that this does not optimize the weight of the resulting piece.

The principal object of this invention is to provide a nut of optimized weight to reduce the losses of material occurring in its process of manufacture to a minimum, and another of the intended objects is that the piece should be much lighter and incorporate much less material.

Another of the objects of this invention is that despite being lighter the nut will have the same or improved mechanical properties in comparison with similar nuts as claimed in the known art.

This and other advantages of this invention will be more apparent in the course of its description.

BRIEF DESCRIPTION OF THE INVENTION

This invention describes a nut formed from a deformed laminar surface, which nut has a flat supporting base rising without discontinuity into an approximately hemispherical portion of the dome type, above which rises a shape which is externally hexagonal and has a threaded cylinder within it.

This nut has a uniform thickness throughout its surface, apart from the hexagonal part where progressive creep of the material to form the inner cylindrical thread occurs as the piece is manufactured, while the exterior remains hexagonal.

This piece and the method of producing it do not start with a metal tube or wire, but a flat strip of uniform thickness. The parts of the washer and the dome are produced without greater complication through deformation of said original sheet, as is the external hexagon.

At this moment in the manufacture of the piece all the final shapes are present except for the internal threaded cylinder. In its place the piece has a hexagonal interior and a uniform thickness over its entire surface area. No loss of material occurs in this process.

The method of manufacture of the nut as claimed in the invention then carries out a progressive press-forging process in which the material of the inner part of the hexagon of the nut is progressively swept or displaced sideways to form the cylindrical threaded shape typical of the invention.

The resulting piece may undergo suitable treatments to provide it with greater hardness and strength, for example with carbon, boron, heat treatment, etc.

There results a light piece manufactured without loss of material which has a uniform thickness. The threaded part has different thicknesses in relation to the position of the outer hexagonal faces and the threaded internal cylinder.

Thanks to the material forming the piece and any hardening treatments received the piece is nevertheless as solid or more solid than those in the known art, being approximately 60% lighter, and has in this way achieved all the intended objects of the invention.

BRIEF DESCRIPTION OF THE DRAWINGS

Plates of drawings provided merely by way of illustration and without limitation are appended to provide a better understanding of the invention.

DETAILED DESCRIPTION OF THE INVENTION

Figure 1:
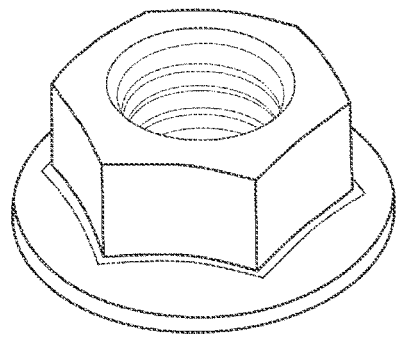
FIG. 1 shows a perspective view of a nut similar to that as claimed in the invention but as claimed in the known art. The thickness of its wall in its hexagonal part, which is necessary to form that external hexagonal part and the internal thread, is clear to see.
Figure 2:
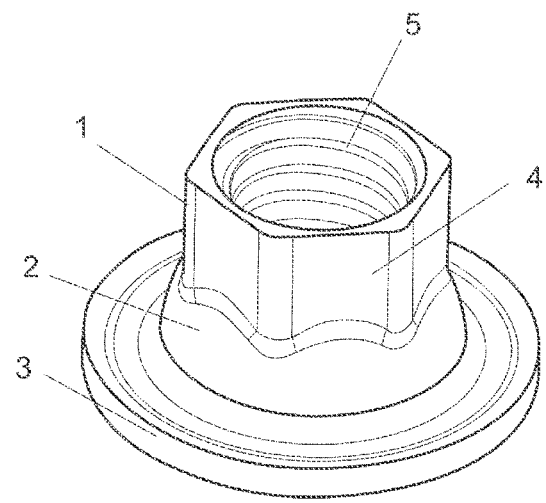
FIG. 2 shows a perspective view of a nut manufactured as claimed in this invention, in which its comparative thinness will be noted.
Figure 3:
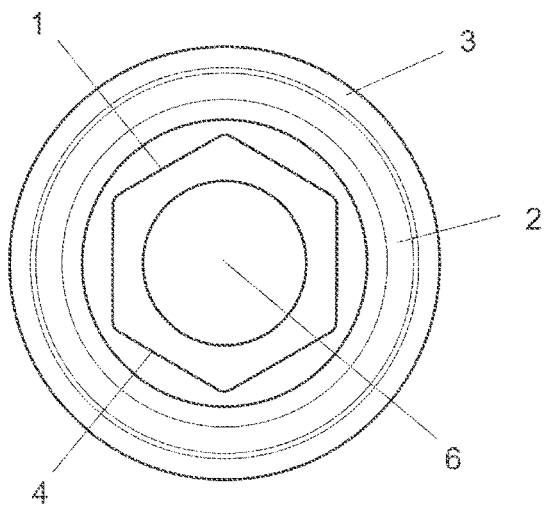
FIG. 3 is a view from above of the nut in the figure above.

This invention comprises a method for manufacturing a nut and the resulting nut, of the type of nuts which incorporate a supporting base and an outer hexagonal profile for the application of a tool, formed from a flat sheet of uniform thickness by press forging, and which has an emergent part (1) ending in a supporting washer (3) without any discontinuity.

The exterior of this emergent part (1) is in the shape of a hexagon, that is it has six faces (4), while there is a threaded interior (5) within it. The whole of the piece is of uniform thickness, specifically that of the laminar sheet or strip from which it is formed; with the exception of this emergent part (1) in which the process of progressive press forging has given rise to the interior threaded portion (5) and has converted an internally and externally hexagonal tube into another with a cylindrical interior, causing a displacement of that material in such a way that the thickness of the emergent part (1) maintains a relationship with the position of a particular point on each face (4).

For example, the greater thickness (7') of the walls of said emergent part occurs at the angles between the various faces (4), while the lesser thickness (7) occurs at an intermediate distance between them.

The result of this application is a nut of very much reduced weight in comparison with the known art, with better use of material, especially in relation to the conventional technique of cold deformation or pressing from a tube or wire of steel or other ferrous material, in which process there is loss and poor utilization of the material.

However, in order to make use of the method of manufacture characteristic of the invention, through progressive press forging from a laminar metal strip, replacing the conventional starting metal tubes in the art, it is necessary to perform a difficult process intended to shape the threaded or emergent part (1) of the nut. This process is extremely difficult because it starts from a surface or material which is much thinner than in the conventional technique. In fact instead of simply tapping the interior of a cylindrical tube as in the known art it is necessary to proceed with progressive press forging which will produce the threaded portion, displacing material laterally from one zone to another, converting a hexagonal interior into another which may or may not be cylindrical, which incorporates said thread (5).

Figure 4:
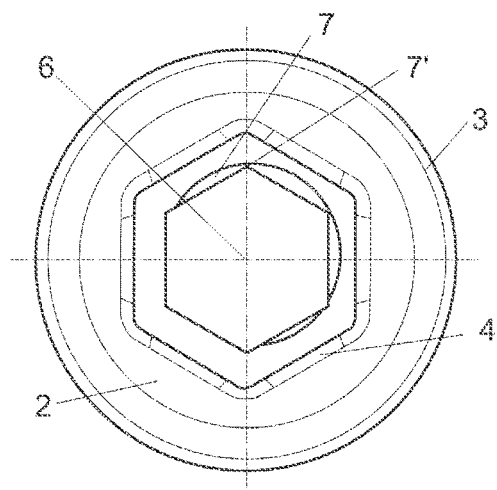
FIG. 4 is a diagrammatical detail of a stage in formation of the internal threaded cylinder of the nut as claimed in the invention in the preceding figures, specifically that of preparing the threaded inner cylinder of the nut.

FIG. 4 illustrates this lateral displacement of material from zones (7) to zones (7'), shaping a cylinder and forming the internal thread (5) of the nut.

In all the embodiments, in the different sizes of nut manufactured as claimed in this invention, the reduction in material obtained in relation to the prior art is approximately around 60%. This significant reduction in weight and material represents an appreciable saving in the large scale manufacture of the piece.

In the preferred embodiment of the invention there is a dome (2), or approximately hemispherical joining portion, providing the nut with a greater reserve of resilience, between said supporting washer (3) and said emergent part (1) having a threaded interior (5).

Furthermore, of the materials used, the process of manufacturing the nut as claimed in the invention preferably uses heat-treated carbon steel, designed to provide greater hardness. In fact the yield strengths Rp 0.2% of the piece are of the approximate order of 1200 MPa in comparison with the 380 MPa of standard steel. The tensile strength Rm is approximately 1400 MPa in comparison with the Rm of 470 MPa for standard steel. The piece obtained is not only lighter, but it is stronger and mechanically more efficient. It has greater strength for a lesser thickness.

The bell-shape, that is, as seen from beneath, allows a screw or bolt which is inserted through its weight into the threaded portion of the emergent part (1) of the opening (6) of the nut to be conveniently lined up. In this respect the nut as claimed in the invention makes it easier to fit because of this ready alignment of the application's bolt.

The invention may take the form of different embodiments, especially different sizes of piece and thicknesses of material, being formed of different materials and in general undergo all the modifications which are included in the appended auxiliary claims.

It is to be understood that in this case all the details of the finish and shape are variable and do not alter the essence of the invention.

The invention claimed is:

1. A METHOD FOR MANUFACTURING A NUT BY THE PROGRESSIVE PRESS FORGING OF A LAMINAR METAL SHEET AND RESULTING NUT, of the type of nut incorporating a supporting base and an external hexagonal profile for the application of a tightening tool, wherein said method comprises the steps of:
   starting from a laminar metal sheet of suitable material and thickness, producing a piece with a supporting washer and an emergent hexagonal part by press forging, said part being of uniform thickness; and
   creating a threaded interior through progressive press forging in the interior of said hexagonal emergent part, displacing material laterally from the central zones of said faces into the zones of the edges;
   applying heat treatment to the piece obtained, treatment intended to provide the piece with greater strength.

2. THE METHOD FOR MANUFACTURING A NUT BY THE PROGRESSIVE PRESS FORGING OF A LAMINAR METAL SHEET AND RESULTING NUT as claimed in claim 1, wherein said press forging produces an approximately hemispherical junction zone between said supporting washer and said emergent part, in the manner of a dome.

3. THE METHOD FOR MANUFACTURING A NUT BY THE PROGRESSIVE PRESS FORGING OF A LAMINAR METAL SHEET AND RESULTING NUT as claimed in claim 1, wherein said treatment of the carbon steel results in a piece having a yield strength Rp 0.2% of approximately 1200 MPa and a tensile strength Rm of approximately 1400 MPa.

4. A NUT, of the type incorporating a supporting base and an outer hexagonal profile for the application of a tool, produced by the method as claimed in claim 1, wherein it has an emergent part which ends in a supporting washer without any discontinuity; said emergent part has an exterior forming a hexagon, that is having six faces, while there is a threaded interior within it.

5. THE NUT, as claimed in claim 4, wherein there is an approximately hemispherical part of the dome type at the join between said supporting washer and said emergent part.

6. THE NUT, as claimed in claim 4, wherein it is made of a strengthened material, such as a technically treated carbon steel, having a yield strength Rp 0.2% of approximately 1200 MPa and a tensile strength Rm of approximately 1400 MPa.

7. THE NUT, as claimed in claim 6, wherein it is of uniform thickness, specifically that of the laminar sheet or strip from which it is formed, except in said emergent part where the process of progressive press forging has given rise to the internal threaded portion and has established that the thickness of this emergent part is in relation to its relative position with respect to the centers of said faces.

8. THE NUT, as claimed in claim 7, wherein said internal threaded portion is cylindrical in shape.

9. THE NUT, as claimed in claim 4, wherein said nut is made of a strengthened material by the treatment of the material with boron.

10. A method of making a nut, comprising:
obtaining an initial component having a laminar surface;
press forming the initial component to produce an emergent component with a supporting washer and an emergent hexagonal, said emergent component having a uniform thickness;
progressively press forming in an interior of the hexagonal emergent part a threaded interior, wherein the action of progressively press forming displaces materially laterally from central zones of faces of the emergent part into the zones of edges of the emergent part; and
applying heat treatment to the component resulting from the press forming, thereby increasing a material strength of the component relative to that which is the case without the heat treatment, thereby producing the nut.

11. The method of claim 10, wherein:
the initial component is a flat strip of material of uniform thickness.

12. The method of claim 10, wherein:
the produced nut includes a washer and an emergent part extending from the washer without any discontinuity.

13. The method of claim 10, wherein:
a greater thickness of walls of said emergent part occurs at angles between the various faces of the hexagon, while lesser thickness occurs at an intermediate distance between the faces.

14. The method of claim 10, wherein:
deforming the produced nut includes a flat washer part and a dome part, which washer part and dome part are made through deformation of the initial component.

15. The method of claim 10, wherein:
the initial component is a laminar metal sheet.

16. The method of claim 10, wherein:
the produced nut has a flat supporting base rising without discontinuity into an approximately hemispherical portion of the dome type, above which rises a shape which is externally hexagonal and has a threaded cylinder therein.

17. The method of claim 10, wherein:
the produced nut has a uniform thickness throughout its surface, apart from the hexagonal part where progressive creep of the material to form the inner cylindrical thread occurs as the piece is manufactured, while the exterior remains hexagonal.

* * * * *